3,150,128
PROCESS OF PRODUCING STEROID COMPOUNDS WITH A γ-LACTONE (18→20) GROUP

Jean Le Men, Limeil-Brevannes, France, assignor to Roger Bellon, Neuilly-sur-Seine, France
No Drawing. Filed May 28, 1963, Ser. No. 283,711
Claims priority, application France, Apr. 4, 1960, 823,271
5 Claims. (Cl. 260—239.57)

This invention relates to a process for the preparation of steroids containing a γ-lactone (18→20) group.

This application is a continuation in part of my copending application Serial No. 99,358, filed March 30, 1961, now abandoned, and entitled "Process of Preparing Steroid Compounds Having a γ-Lactone (18→20) Group."

The well known Oppenauer reaction consists in oxidizing an alcohol by heating the same in a hydrocarbon solvent with an excess of a ketone in the presence of an alkali metal or aluminum phenolate or alcoholate, as catalyst.

It is one object of the present invention to apply this Oppenauer reaction to steroid compounds which contain hydroxyl group in 18- and 20-position, thereby providing a simple and effective process of producing γ-lactones (18→20) from 18,20-dihydroxy steroids.

Other objects of the present invention and advantageous features thereof will become apparent as the description proceeds.

In principle, the process according to the present invention comprises oxidizing an 18,20-dihydroxy steroid compound of Formula I:

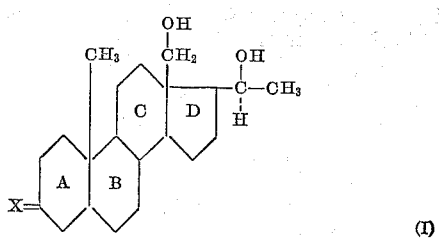

wherein X is a secondary hydroxyl group, a keto group, or an amino group and which may contain double bonds in rings A and/or B and/or D and additional substituents in rings B, C, or D, such as hydroxyl groups, keto groups, or methyl, in a single operation to form the corresponding lactones by heating such steroids in a hydrocarbon with an excess of a ketone and using an alkali metal or aluminum phenolate or alcoholate as catalyst.

A particularly suitable steroid compound is the diol of Formula II:

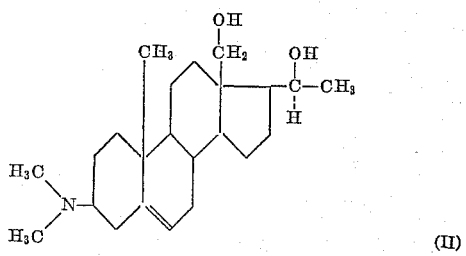

i.e., (20 S)-3β-(N-dimethylamino)-18,20-dihydroxy pregna-5-ene of the melting point 228° C. Said compound yields the corresponding lactone, (20 S)-3β-(N-dimethylamino)-20-hydroxy-18-oic lactone (→20) pregna-5-ene. This compound is designated by following the rules of nomenclature established by Cahn, Ingold, and Prelog ("Experientia," vol. 12, 1956, page 81). This lactone has been designated N-methyl paravallarine. It corresponds to the following Formula III:

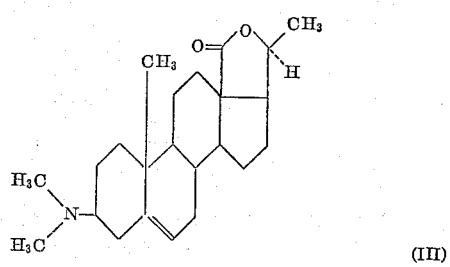

The reaction according to the present invention differs from the Oppenaure reaction in the feature that the two alcohol groups attached to the same molecule are oxidized simultaneously and that such oxidation is accompanied by an internal oxidation-reduction reaction resulting in the formation of a lactone.

The two reactions which take place in a single operation are first simultaneous formation of an aldehyde group and a keto group on the same molecule, and secondly the oxidation-reduction reaction between these two groups.

The following examples are given to further illustrate the present invention without however, limiting the same thereto:

Example 1

315 mg. of the diol of Formula II given hereinabove and 1 g. of fluorenone are dissolved in 50 c. of dry benzene; 100 mg. of potassium tertiary butylate are added to this solution. The mixture is kept for 1½ hours at boiling point under nitrogen and, after cooling, the reaction products are poured into a mixture of 2 cc. of concentrated hydrochloric acid (density 1.19), 50 cc. of water, 50 g. of ice, and 100 cc. of ether. The mixture is stirred and the aqueous phase is decanted. It is washed twice with 50 cc. of ether and made alkaline to a pH value of 10.0 by adding ammonia. The resulting precipitate is then extracted with 200 cc. of ether. The ethereal phase is decanted and washed with 50 cc. of water; it is dried over sodium sulfate and distilled on a water bath. The dry residue which is obtained thereby and which weighs 297 mg. is dissolved in 10 cc. of benzene and is subjected to chromatography on 6 g. of alumina. By elution with benzene, there are obtained 205 mg. of a white crystalline residue, melting at 140° C. The product thus obtained is N-methyl paravallarine. This is proved by determining the melting point of a mixture of N-methyl paravallarine with the reaction product according to the present invention which does not show any depression, and by comparing the infra-red spectra of the reaction product with the known infra-red spectrum of N-methyl paravallarine.

Example 2

300 mg. of (20 S)-5α-pregnane-3β,18,20-triol of Formula IV:

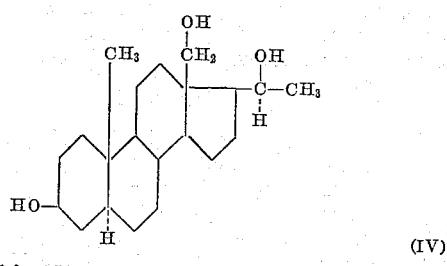

are dissolved in 150 cc. of anhydrous toluene. The solution is heated under reflux in a nitrogen atmosphere with 200 mg. of sodium ethanolate, 100 mg. of aluminum isopropylate, and 2 cc. of cyclohexanone for 2 hours. After cooling, the solution is washed three times with 50 cc. of N hydrochloric acid and three times with 50 cc. of water. The resulting solution is dried over sodium sulfate and distilled to dryness. 290 mg. of a residue are obtained which are dissolved in 50 cc. of benzene. The benzene solution is subjected to chromatographic adsorption on 6 g. of aluminum oxide. The adsorbed compound is eluted by means of benzene. 210 mg. of a white compound are obtained. On recrystallization from ether, 158 mg. of (20 S)-3-oxo-20-hydroxy-18-oic lactone (→20)-5α-pregnane of Formula V are obtained. Its melting point is 178° C. Its optical rotation $\alpha_D$ is $+17°$ (concentration: 0.2% in chloroform). This compound is identical with the known compound in its physical characteristics and its infrared spectrum.

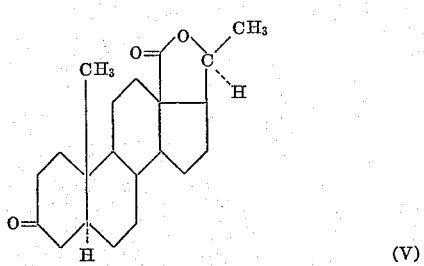

(V)

*Example 3*

When using (20 S)-3β-N-dimethylamino-16β,18,20-trihydroxy-5α-pregnane of the melting point 220° C., in place of the starting diol of Formula II, and otherwise proceeding as described in Example 1, the corresponding (20 S)-3β-N-dimethylamino-16-oxo-20-hydroxy-18-oic lactone (→20)-5α-pregnane of the melting point 206° C. and the optical rotation $\alpha_D = -247°$ (concentration: 0.2% in chloroform) is obtained.

*Example 4*

When using (20 S)-3-oxo-18,20-dihydroxy-5α-pregnane, in place of (20 S)-5α-pregnane-3β,18,20-triol of Formula IV, and otherwise proceeding as described in Example 2, the corresponding (20 S)-3-oxo-20-hydroxy-18-oic lactone (→20)-5α-pregnane is obtained.

*Example 5*

When using acetone, in place of fluorenone, and aluminum tertiary butylate, in place of potassium butylate, but otherwise proceeding as described in Example 1, the same N-methyl paravallarine is obtained.

*Example 6*

When using methyl ethyl ketone, in place of cyclohexanone, and sodium phenolate, in place of sodium ethanolate, the otherwise proceeding as described in Example 2, the same (20 S)-3-oxo-20-hydroxy-18-oic lactone (→20)-5α-pregnane is obtained.

*Example 7*

When using acetophenone, in place of fluorenone, and aluminum tertiary butylate, in place of potassium butylate, but otherwise proceeding as described in Example 1, the same N-methyl paravallarine is obtained.

*Example 8*

When using benzophenone, in place of cyclo hexanone, and sodium phenolate, in place of sodium ethanolate, and otherwise proceeding as described in Example 2, the same (20 S)-3-oxo-20-hydroxy-18-oic lactone (→20)-5α-pregnane is obtained.

In place of the 18,20-dihydroxy steroid compounds used as starting materials in the preceding examples, other steroid compounds may also be used provided they carry ring D of the following configuration:

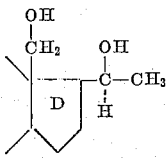

Such other 18,20-dihydroxy steroid compounds are, for instance, (20 S)-3β-acetyloxy-18,20-dihydroxy-5α-pregnane,
(20 S)-3β-N-methyl-N-ethylamino-16-oxo-18,20-dihydroxy-5α-pregnane,
(20 S)-3β-N-methyl-N-acetylamino-18,20-dihydroxy-5α-pregnane.

Substituents in rings, A, B, and C and further substituents in ring D such as the 16-hydroxyl group do not affect γ-lactone (18→20) formation according to the present invention. If secondary hydroxyl groups are present in other positions of the steroid ring system, they are simultaneously converted into keto groups.

The reaction conditions and the ketones and catalysts used in the present reaction are those conventionally used in the Oppenauer reaction as they are described, for instance, in the review by Djerassi in "Organic Reactions," vol. 6, page 207, John Wiley & Sons, New York 1951.

I claim:

1. In a process of preparing (20 S)-3β-(N-dimethylamino)-20-hydroxy-18-oic lactone (→20)-pregna-5-ene, the step which comprises heating (20 S)-3β-(N-dimethylamino)-18,20-dihydroxypregna-5-ene, in benzene solution, with fluorenone in the presence of potassium tert. butylate as catalyst.

2. In a process of producing steroid compounds having attached to ring D a γ-lactone (18→20) group of the following structure

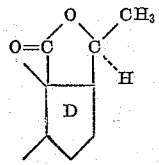

the step which comprises heating an 18,20-di-hydroxy steroid compound with ring D of the following structure

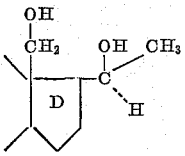

in a hydrocarbon solvent with an excess of a ketone in the presence of a catalyst selected from the group consisting of an alkali metal phenolate, an alkali metal alcoholate, and an aluminum alcoholate.

3. In a process of producing (20 S)-3β-(N-dimethylamino)-20-hydroxy-18-oic lactone (→20)-pregna-5-ene, the step which comprises heating (20 S)-3β-(N-dimethylamino)-18,20-dihydroxy pregna-5-ene in a hydrocarbon solvent with an excess of a ketone in the presence of a catalyst selected from the group consisting of an alkali metal phenolate, an alkali metal alcoholate, and an aluminum alcoholate.

4. In a process of preparing (20 S)-3-oxo-20-hydroxy-18-oic lactone (→20)-5α-pregnane, the step which comprises heating (20 S)-5α-pregnane-3β,18,20-triol, in toluene solution, with cyclohexanone in the presence of sodium ethanolate and aluminum isopropylate as catalyst.

5. In a process of preparing (20 S)-20-hydroxy-18-oic lactone (→20) pregnane compounds of the formula

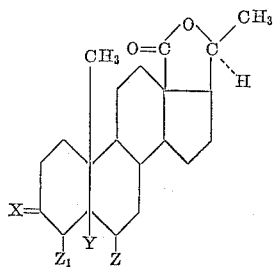

wherein

X is a member selected from the group consisting of the oxo group=O, the secondary hydroxyl group

the di-(lower) alkylamino group, the mono-(lower) alkylamino group, the secondary acyloxy group, and the N-(lower alkyl)-N-acylamino group; and Y, Z, and $Z_1$ are members selected from the group consisting of hydrogen, Y and $Z_1$, forming a double bond and Z being hydrogen when X is the oxo group, and Y and Z forming a double bond and $Z_1$ being hydrogen, when X is one of the other substituents, the step which comprises heating a (20 S)-18,20 diol steroid compound of the formula

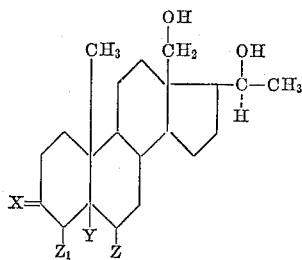

wherein

X, Y, Z, and $Z_1$ represent the same substituents as indicated above, in solution in a hydrocarbon solvent, with an excess of a ketone selected from the group consisting of acetone, methyl ethyl ketone, cyclohexanone, fluorenone, acetophenone, and benzophenone in the presence of a catalyst selected from the group consisting of an alkali metal phenolate, an alkali metal alcoholate, and an aluminum alcoholate.

No references cited.